(12) United States Patent
Xu et al.

(10) Patent No.: US 11,123,858 B2
(45) Date of Patent: Sep. 21, 2021

(54) HUB SURFACE SCRIBING DEVICE

(71) Applicant: CITIC Dicastal CO., LTD., Hebei (CN)

(72) Inventors: Zuo Xu, Qinhuangdao (CN); Liqun Zheng, Qinhuangdao (CN); Jiwei Zhou, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 398 days.

(21) Appl. No.: 16/257,242

(22) Filed: Jan. 25, 2019

(65) Prior Publication Data
US 2019/0358806 A1    Nov. 28, 2019

(30) Foreign Application Priority Data
May 24, 2018    (CN) .......................... 201810504929.6

(51) Int. Cl.
*G01N 19/04*    (2006.01)
*B25H 7/04*    (2006.01)

(52) U.S. Cl.
CPC .............. *B25H 7/04* (2013.01); *G01N 19/04* (2013.01)

(58) Field of Classification Search
CPC ................................. B25H 7/04; G01N 19/04
USPC ......................................................... 33/18.1
See application file for complete search history.

(56) References Cited

U.S. PATENT DOCUMENTS

| 4,104,939 A * | 8/1978 | Bonaddio | B26D 3/085 33/18.1 |
| 5,412,997 A * | 5/1995 | Hu | G01N 19/04 73/150 A |
| 5,454,260 A * | 10/1995 | Wang | G01N 3/567 73/150 A |
| 8,667,844 B1 * | 3/2014 | Broadbent | G01N 19/04 73/588 |
| 9,207,161 B2 * | 12/2015 | Chang | G01N 19/04 |
| 10,328,744 B2 * | 6/2019 | Chang | B44B 3/063 |
| 2005/0086816 A1 * | 4/2005 | Siegel | B44B 5/0095 33/18.1 |
| 2007/0144018 A1 * | 6/2007 | Tseng | B44B 3/063 33/32.3 |
| 2010/0206062 A1 * | 8/2010 | Yoon | G01N 19/04 73/150 A |
| 2011/0283552 A1 * | 11/2011 | Soyama | B28D 5/0064 33/18.1 |
| 2019/0358806 A1 * | 11/2019 | Zheng | B25H 7/04 |

* cited by examiner

*Primary Examiner* — Yaritza Guadalupe-McCall
(74) *Attorney, Agent, or Firm* — Cooper Legal Group, LLC

(57) ABSTRACT

Disclosed in the present disclosure is a hub surface scribing device. Four sets of support rods are arranged symmetrically with each other on right side of a base plate, a set of support blocks are mounted at top of each set of support rods, a first polished rod extends between a set of support blocks on left side and a set of support blocks on right side, a first guide sleeve is slideably connected to the first polished rod, the first polished rod is slideably sleeved with a stop block, a first locking bolt penetrates the stop block, a second polished rod extends through two sets of first guide sleeves, the second polished rod is slideably sleeved with a second guide sleeve, a second locking bolt also penetrates the second guide sleeve, a support block is welded to top of the second guide sleeve.

6 Claims, 2 Drawing Sheets

HUB SURFACE SCRIBING DEVICE

CROSS-REFERENCE TO RELATED APPLICATIONS

The present application claims benefit of Chinese Application No. 201810504929.6, filed on May 24, 2018, the contents of which are hereby incorporated by reference in its entirety.

BACKGROUND

In order to test adhesion of a paint film on surface of a hub, it is necessary to scribe the surface of the hub. The conventional scribing method is all manual scribing, which not only has low scribing efficiency, but also has large error to affect subsequent testing results.

SUMMARY

The present disclosure relates to a hub paint film adhesion test, in particular to a hub surface scribing device.

Disclosed in the present disclosure is a hub surface scribing device, and the device is convenient to operate, improves the scribing efficiency and provides convenience for the adhesion test of a paint film on the surface of a hub.

In order to achieve the above objectives, the present disclosure provides the following technical solution: a hub surface scribing device, includes a base plate, herein four sets of support rods are arranged symmetrically with each other on right side of the base plate, a set of support blocks are mounted at top of each set of support rods, a first polished rod extends between a set of support blocks on left side and a set of support blocks on right side, a first guide sleeve is connected to the first polished rod in a sliding manner, the first polished rod close to the front side of the base plate is sleeved with a stop block in a sliding manner, a first locking bolt penetrates the stop block, a second polished rod penetrate two sets of first guide sleeves, the second polished rod is sleeved with a second guide sleeve in a sliding manner, a second locking bolt also penetrates the second guide sleeve, a support block is welded to top of the second guide sleeve, a guide rod extend through the support block transversely and obliquely, a shank block is hinged to left end of the guide rod via a pin rod, a blade is mounted at bottom of the shank block, an upright rod is in threaded connection to top of the shank block, weight blocks penetrate the upright rod, a clamp is mounted at bottom of the blade, spacers are stacked on left side of the clamp, and a third locking bolt penetrates right side of the clamp.

A top block is welded to top of each first guide sleeve.

At least one set of weight blocks are provided, and each of the weight blocks is provided with a through hole matching the upright rod.

A square block and a stop rod are both arranged on front side and rear side of the clamp, the square blocks are arranged close to the clamp, and the stop rods are located outside the square blocks and fixed on the base plate.

Positioning rod holes are formed at fixed positions corresponding to the stop rods in the base plate, and the positioning rod holes are distributed in a rectangular array on a side close to the clamp.

The clamp includes pressing sheets, adjusting bolts and a arc groove, positioning bolts are provided on top of the clamp, four sets of pressing sheets are symmetrically arranged on the top of the clamp, and the third locking bolt is arranged on the right side of the clamp.

Two sets of clamp structures are used to fix and clamp hub sections in different shapes, such that the adaptability is higher; a line can be scribed according to the depth by increasing or decreasing the number of the weight blocks, and the line can be scribed equidistantly by the limiting of the stop blocks, such that the operation is convenient; and the mechanized scribing method improves the scribing efficiency, reduces the manual error, and provides convenience for the paint film adhesion test.

LIST OF REFERENCE SYMBOLS 1 base plate, 2 support rod, 3 support block, 4 first polished rod, 5 stop block, 6 first locking bolt, 7 first guide sleeve, 8 top block, 9 second polished rod, 10 second guide sleeve, 11 support block, 12 guide rod, 13 pin rod, 14 shank block, 15 blade, 16 upright rod, 17 weight block, 18 clamp, 19 square block, 20 stop rod, 21 positioning rod hole, 22 spacer, 23 third locking bolt, 24 top plate, 25 pressing sheet, 26 adjusting bolt, 27 arc groove.

DETAILED DESCRIPTION

The following clearly and completely describes the technical solutions in the embodiments of the present disclosure with reference to the figures in the embodiments of the present disclosure.

Figure 1:
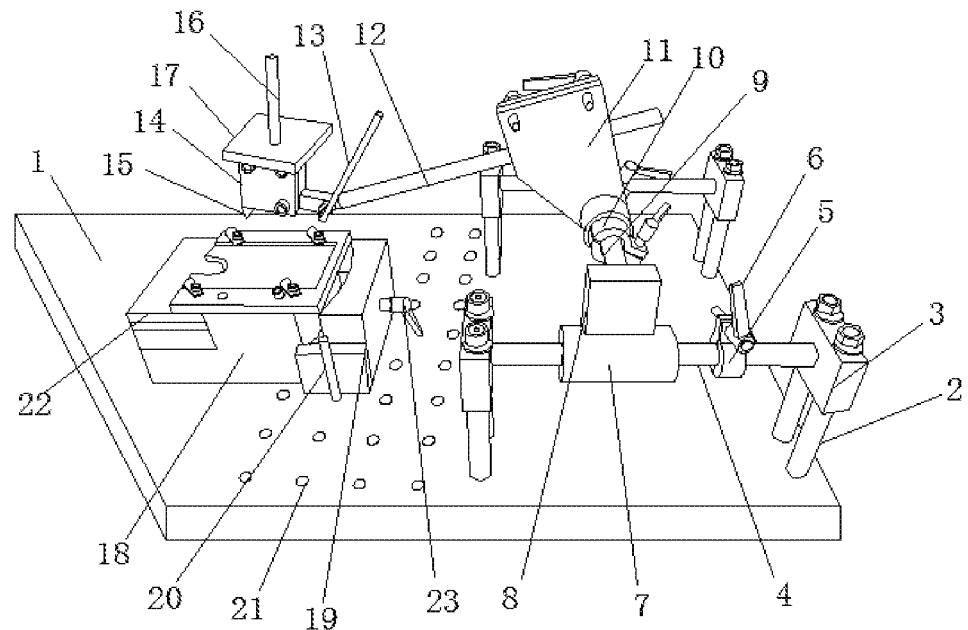
FIG. 1 is a structure diagram according to the present disclosure.
Figure 2:
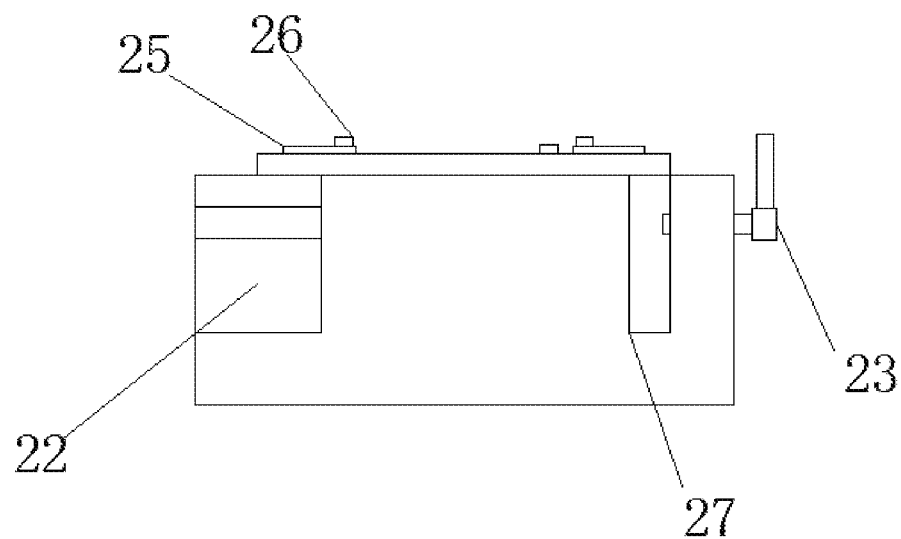
FIG. 2 is a front-view structure diagram of a first clamp according to the present disclosure.
Figure 3:
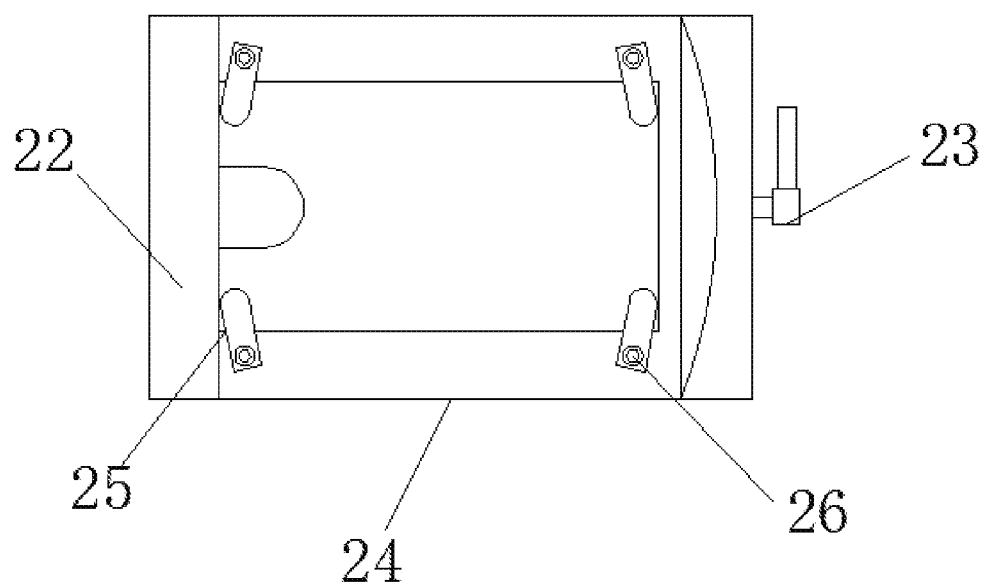
FIG. 3 is a top-view structure diagram of the first clamp according to the present disclosure.

With reference to FIG. 1, FIG. 2 and FIG. 3, the present disclosure provides a first technical solution: a hub surface scribing device, includes a base plate 1, herein four sets of support rods 2 are arranged symmetrically with each other on right side of the base plate 1, a set of support blocks 3 are mounted at top of each set of support rods 2, and the support rods 2 and the support blocks 3 are both of stainless steel structures; a first polished rod 4 extends between a set of support blocks 3 on left side and a set of support blocks on right side, a first guide sleeve 7 is connected to the first polished rod 4 in a sliding manner, the first polished rod 4 is sleeved with a stop block 5, a first locking bolt 6 penetrates the stop block 5, and the stop block 5 can be adjusted according to the scribing requirements, and can be locked and fixed by the first locking bolt 6; a second polished rod 9 extends between two sets of first guide sleeves 7, a second guide sleeve 10 is connected to the second polished rod 9 in a sliding manner, a second 1 ocking bolt 6 also penetrates the second guide sleeve 10, a support block 11 is welded to top of the second guide sleeve 10, a guide rod 12 penetrates the support block 11 transversely and obliquely, and a shank block 14 is hinged to left end of the guide rod 1 2 via a pin rod 13 such that the position and angle of the shank block 14 are easy to adjust to facilitate scribing; a blade 15 is mounted at bottom of the shank block 14, an upright rod 16 is in threaded connection to top of the shank block 14, weight blocks 17 penetrate the upright rod 16, the weight blocks 17 are used for balancing the weight, and the number of the weight blocks 17 can be increased or decreased to scribe lines of different depths; a clamp 18 is mounted at bottom of the blade 15, spacers 22 are stacked on left side of the clamp 18, and the number of the spacers 22 can be selected according to the actual situation; and a third locking bolt 23 penetrates right side of the clamp 18.

A top block 8 is arranged at top of each first guide sleeve 7. The first guide sleeves 7 can slide on the first polished rods 4 easily, and the second polished rod 9 extends between the top blocks 8.

At least one set of weight blocks 17 are provided, and the weight block 17 is provided with a through hole matching the upright rod 16.

By adopting the above technical solution, a matching through hole structure is provided to facilitate the increase and decrease of the weight blocks 17 on the upright rod 16, so as to change the weight.

A square block 19 and a stop rod 20 are both arranged on the front side and rear side of the clamp 18, the square blocks 19 are arranged close to the clamp 18, and the stop rods 20 are located outside the square blocks 19 and fixed on the base plate 1.

By adopting the above technical solution, the square blocks 19 and the stop rods 20 can limit and fix the clamp 18.

Positioning rod holes 21 are formed at fixed positions corresponding to the stop rods 20 in the base plate 1, and the positioning rod holes 21 are distributed in a rectangular array.

By adopting the above technical solution, different positioning rod holes 21 can be selected to fix the stop rods 20 according to the installation requirement of the clamp 18.

The clamp 18 includes pressing sheets 25, adjusting bolts 26 and an arc groove 27, four sets of pressing sheets 25 are symmetrically arranged on top of the clamp 18, and the third locking bolt 23 is arranged on the right side of the clamp 18.

By adopting the above technical solution, one side of a hub workpiece is caught in the arc groove 27 and fixed by the third locking bolt 23, and the four sets of pressing sheets 25 on the top plate 24 can be adjusted to fix and limit four sides of the hub workpiece to facilitate scribing.

In use, a hub section is fixed on the clamp 18, a different clamping mode is selected according to a different section shape, suitable spacers 22 are mounted on the left side of the clamp 18, the hub section is fixed by the second locking bolt 23, the number of weight blocks 17 is increased according to the scribing depth, the blade 15 is attached to the position of the hub to be scribed, the stop blocks 5 on the first polished rods 4 and the second polished rod 9 are fixed in advance according to the requirement of scribing length, the second polished rod 9 is moved left and right, the blade 15 can scribe transversely, the first polished rods 4 are moved back and forth, and the blade 15 can scribe longitudinally.

The invention claimed is:

1. A hub surface scribing device, comprising a base plate, wherein four sets of support rods are arranged symmetrically with each other on right side of the base plate, a set of support blocks are mounted at top of each set of support rods, a first polished rod extends between a set of support blocks on left side and a set of support blocks on right side, a first guide sleeve is connected to the first polished rod in a sliding manner, a stop block is arranged on one side of the first guide sleeve, a first locking bolt penetrates the stop block, a second polished rod is arranged between two sets of first guide sleeves, a second guide sleeve is sleeved on the second polished rod in a sliding manner, a second locking bolt also penetrates the second guide sleeve, a support block is welded to top of the second guide sleeve, a guide rod is connected to the support block, a shank block is connected to left end of the guide rod via a pin rod, a blade is mounted at bottom of the shank block, an upright rod is in threaded connection to top of the shank block, weight blocks penetrate the upright rod, a clamp is mounted at bottom of the blade, spacers are stacked on right side of the clamp, and a third locking bolt penetrates left side of the clamp.

2. The hub surface scribing device according to claim 1, wherein a top block is welded to top of each first guide sleeve.

3. The hub surface scribing device according to claim 1, wherein each weight block is provided with a through hole matching the upright rod.

4. The hub surface scribing device according to claim 1, wherein a square block and a stop rod are arranged both on front side and rear side of the clamp, the square blocks are arranged close to the clamp, and the stop rods are located outside the square blocks and fixed on the base plate.

5. The hub surface scribing device according to claim 1, wherein the base plate is provided with positioning rod holes, and the positioning rod holes are distributed in a rectangular array.

6. The hub surface scribing device according to claim 1, wherein the clamp comprises pressing sheets, adjusting bolts and an arc groove, four sets of pressing sheets are symmetrically arranged on top of the clamp, and the third locking bolt is arranged on the right side of the clamp.

* * * * *